United States Patent [19]
Komiya et al.

[11] Patent Number: 6,024,113
[45] Date of Patent: Feb. 15, 2000

[54] METHOD OF PREVENTING EXTERNAL CONTAMINATION IN MULTIPLE TANK FLUID SYSTEMS

[76] Inventors: Keinosuke Komiya; Ken Komiya, both of 21-10 Toshin-cho, 1-chome, Itabashi-Ku Tokyo, Japan, 174

[21] Appl. No.: 08/923,977

[22] Filed: Sep. 5, 1997

[51] Int. Cl.⁷ .............................. E03C 1/10; E03C 11/02
[52] U.S. Cl. ............................................ 137/208; 137/209
[58] Field of Search ...................................... 137/208, 209

[56] References Cited

U.S. PATENT DOCUMENTS

| | | | |
|---|---|---|---|
| 242,806 | 6/1881 | Aikman et al. | 137/209 |
| 844,936 | 2/1907 | Harris et al. | 137/209 |
| 3,746,032 | 7/1973 | Wallgren | 137/205 |
| 5,218,986 | 6/1993 | Farwell | 137/209 X |
| 5,778,922 | 7/1998 | Schoultz | 137/208 |

*Primary Examiner*—Gerald A. Michalsky

[57] ABSTRACT

A closed tank method for preventing contamination in multiple tank systems. Water and air being the preferred liquids.

2 Claims, 1 Drawing Sheet

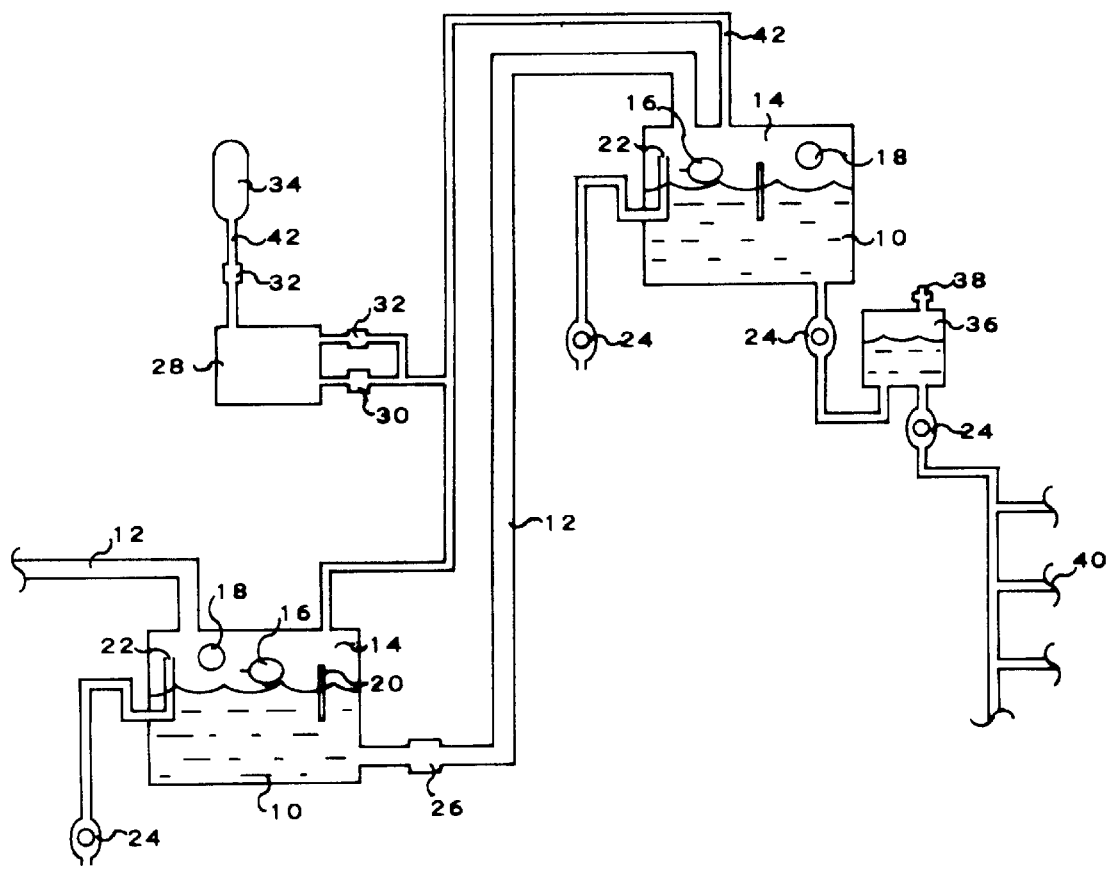

METHOD OF PREVENTING EXTERNAL CONTAMINATION IN MULTIPLE TANK FLUID SYSTEMS

CROSS REFERENCES TO RELATED APPLICATIONS

Not Applicable

BACKGROUND

1. Field of Invention

The present invention relates to liquid distribution systems for transferring liquids under pressure. More specifically, the invention relates to a system that uses multiple tanks and a combination of air and liquid pressure to transfer liquid within a closed system to prevent contamination from outside the system.

BACKGROUND

2. Description of Prior Art

One of the basic requirements of a liquid distribution system is the ability to transfer the liquid under pressure from a point of supply to a point where it is usable. A common example is a water supply system in a multi-storied building, which in most cases transfers water under pressure by using combinations of pumbs, multiple storage tanks at different elevations, water and air pressure, and some means to both sustain yet equalize pressures. Such systems are usually open to contamination from sources outside the system due to openings in the system necessary to equalize combinations of air and water pressures.

Accordingly, it is an object of the present invention to provide a closed system to prevent contamination from external sources.

Another object is to provide a method for pressure equalization within the closed system.

Other objects will appear hereinafter.

OBJECTS AND ADVANTAGES

Accordingly, several objects and advantages of my invention are clean, pressurized air within the system, valves at inlets and outlets to prevent contamination from the outside, and closing off the system to human entry and resultant risk of contamination.

Still further objects and advantages will become apparent from a consideration of the ensuing description and accompanying drawings.

BRIEF DESCRIPTION OF THE DRAWINGS

The sole FIGURE is a drawing showing the closed multiple tank system.

REFERENCE NUMERALS 10 liquid
12 standard plumbing pipe and fixtures
14 tank
16 float valve
18 air pressure sensor
20 water level sensor
22 overflow drain
24 floating ball valve
26 water pump
28 air storage tank
30 air regulators
32 air valves
34 compressed air tanks
36 water traps
38 pressure release valves
40 outlet piping
42 standard air piping

SUMMARY

The method of the invention is to prevent the entry of contamination from external sources into multiple tank fluid supply systems by closing the system off from the outside atmosphere and human entry as much as possible. This is accomplished by means of using changable compressed air tanks and regulatory devices to control air pressure within the system, by closing or restricting the size of ports that would permit human entry, and by utilizing weighted float valves to drain excess liquid and prevent backflow, while shutting off the drains from atmospheric and biological contamination.

PREFERRED EMBODIMENT

Description

While the invention may be used with other liquids and gases, it is preferred that water and air be the fluids of choice. Two or more tanks are used for holding water under air or its own pressure.

In the preferred embodiment, liquid 10 enters the system via standard plumbing pipe and fixtures 12 into a tank 14 and rises to a desired level until shut off by a mechanical float valve 16. Inside air pressure is regulated by means of an air pressure sensor 18. A water level sensor 20 ensures a minimum level, and an overflow drain 22 disposes excess liquid.

A floating ball valve 24 allows liquid disposal but prevents contamination from entering the tank. A water pump 26 transfers liquid to elevated tanks.

Internal pressure is regulated using an air storage tank 28, air regulators 30, air valves 32, and changable compressed air tanks 34, distributed via standard air piping 42.

To prevent gas and contaminants from entering from the user side of the supply system, water traps 36 and pressure release valves 38 are used, and float valves 16 prevent backflow.

Liquid is dispensed on the user end via standard plumbing outlet piping 40 and fixtures.

Operation

As shown in the drawing, a system is provided with two or more tanks 14, shown in the preferred embodiment of one being a higher elevation than the other to take advantage of gravity flow.

Liquid 10 enters into the system from what is understood to be a commercial pressurized supply source that is free of contaminants. The design of the invention is to close off the system from outside contamination from this point to the point of discharge of the liquid to the user.

Rather than using an air breather open to outside contamination, float valves 16 are used, which lift to allow excess liquid to drain, but are held closed by gravitational weight otherwise. The combination of air piping 42, air storage tanks 28, air regulators 30, air valves 32 and compressed air tanks 34 are all for the purpose of using clean, pressurized air without being open to the outside, often contaminated, atmosphere.

To prevent backflow and stop contamination and gasses from entering the system, water traps 36, pressure release safety valves 38, and float ball valves 24 are utilized.

Float valves 16, air pressure sensors 18, water level sensors 20 and all ports of entry into the system are designed to regulate the flow of liquid in a closed environment and to prevent the entry of humans and the resulting risk of conamination into the system.

CONCLUSIONS, RAMIFICATIONS, AND SCOPE

Accordingly, it can be seen that the invention method is designed to prevent external contamination from entering into multiple tank fluid systems.

Although the description above contains many specificities, these should not be construed as limiting the scope of the invention but as merely providing illustrations of some of the presently preferred embodiments of this invention. Various other embodiments and ramifications are possible within it's scope.

Thus the scope of the invention should be determined by the appended claims and their legal equivalents, rather than by the examples given.

What is claimed is:

1. A liquid distribution system useful for multi-storied structures and using multiple tanks which are closed off from outside atmospheric pollution and comprising:

tanks containing water level sensors, air pressure sensors, float valves and overflow valves containing floating ball valves;

plumbing, piping, regulatory valves and sensors, and compressed air between tanks for equalization of pressure within the system;

and valve means to purge excess air and water and also prevent backflow.

2. The system of claim 1 where all ports are designed to restrict human entry, thereby limiting the possibility of human-related contamination into the system.

* * * * *